United States Patent
Wu et al.

(10) Patent No.: US 9,188,787 B2
(45) Date of Patent: Nov. 17, 2015

(54) TOUCH GRATING, DISPLAY DEVICE AND METHOD OF REALIZING STEREOSCOPIC DISPLAY AND TOUCH FUNCTIONS

(71) Applicant: BEIJING BOE OPTOELECTRONICS TECHNOLOGY CO., LTD., Beijing (CN)

(72) Inventors: Junwei Wu, Beijing (CN); Shengji Yang, Beijing (CN); Haisheng Wang, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/128,652

(22) PCT Filed: Nov. 13, 2012

(86) PCT No.: PCT/CN2012/084535
§ 371 (c)(1),
(2) Date: Dec. 23, 2013

(87) PCT Pub. No.: WO2013/163871
PCT Pub. Date: Nov. 7, 2013

(65) Prior Publication Data
US 2014/0125887 A1 May 8, 2014

(30) Foreign Application Priority Data
May 3, 2012 (CN) .......................... 2012 1 0134897

(51) Int. Cl.
*G02F 1/1333* (2006.01)
*G02B 27/22* (2006.01)
(Continued)

(52) U.S. Cl.
CPC ............ *G02B 27/22* (2013.01); *G02F 1/13338* (2013.01); *G06F 3/045* (2013.01); *G02F 1/1345* (2013.01)

(58) Field of Classification Search
CPC .............. G02F 1/1345; G02F 1/13338; G02F 1/134309; G02B 27/22; G06F 3/045

USPC .............. 349/12, 15, 193, 200, 201; 345/173, 345/174
See application file for complete search history.

(56) References Cited

U.S. PATENT DOCUMENTS

2009/0009487 A1* 1/2009 Nishitani et al. .............. 345/174
2009/0289643 A1 11/2009 Shimizu et al.
(Continued)

FOREIGN PATENT DOCUMENTS

CN 101339312 A 1/2009
CN 101587412 A 11/2009
(Continued)

OTHER PUBLICATIONS

First Office Action of the State Intellectual Property Office of the People's Republic of China in Application No. CN20121034897.8, issued Mar. 7, 2013; 6 pgs.
(Continued)

*Primary Examiner* — Dung Nguyen
*Assistant Examiner* — Tai Duong

(57) ABSTRACT

A touch grating, a display device and a method of realizing stereoscopic display and touch functions. The touch grating includes: a first substrate (101); a second substrate (102), disposed in opposition to the first substrate (101); a planar electrode (103), disposed at an inner side of the first substrate (101) facing the second substrate (102); a plurality of strip-shaped electrodes (104), being parallel to each other and disposed at an inner side of the second substrate (102) facing the first substrate (101); and liquid crystal (108), disposed between the first substrate (101) and the second substrate (102) and driven by the planar electrode (103) and the strip-shaped electrodes (104), wherein wirings (105) are provided at four terminals of the planar electrode (103), respectively, and the wirings (105) provided at the four terminals are used to determine a touch position.

18 Claims, 2 Drawing Sheets

(51) Int. Cl.
*G06F 3/045* (2006.01)
*G02F 1/1345* (2006.01)

(56) References Cited

U.S. PATENT DOCUMENTS

| | | | |
|---|---|---|---|
| 2010/0182273 | A1* | 7/2010 | Noguchi et al. ............ 345/174 |
| 2012/0235954 | A1 | 9/2012 | Bytheway et al. |

FOREIGN PATENT DOCUMENTS

| | | | |
|---|---|---|---|
| CN | 102073161 | A | 5/2011 |
| CN | 201993554 | U | 9/2011 |
| CN | 10224481 | A | 10/2011 |
| CN | 102262478 | A * | 11/2011 |
| CN | 102692748 | A | 9/2012 |
| CN | 202600302 | U | 12/2012 |
| JP | 2003099192 | A | 4/2003 |
| JP | 2006-146895 | A * | 6/2006 |
| JP | 2010117829 | A | 5/2010 |
| JP | 2020107685 | A | 5/2010 |

OTHER PUBLICATIONS

English Translation of First Office Action of the State Intellectual Property Office of the People's Republic of China in Application No. CN20121034897.8, issued Mar. 7, 2013; 6 pgs.

Second Office Action of the State Intellectual Property Office of the People's Republic of China in Application No. CN20121034897.8, issued May 17, 2013; 4 pgs.

English Translation of Second Office Action of the State Intellectual Property Office of the People's Republic of China in Application No. CN20121034897.8, issued May 17, 2013; 5 pgs.

Third Office Action of the State Intellectual Property Office of the People's Republic of China in Application No. CN20121034897.8, issued Sep. 11, 2013; 3 pgs.

English Translation of Third Office Action of the State Intellectual Property Office of the People's Republic of China in Application No. CN20121034897.8, issued Sep. 11, 2013; 4 pgs.

Notification to Grant the Patent Right (Notice of Allowance) for Chinese Application No. 201210134897.8, dated Jan. 30, 2014; 3 pgs.

English Translation of Notification to Grant the Patent Right (Notice of Allowance) for Chinese Application No. 201210134897.8, dated Jan. 30, 2014; 2 pgs.

PCT International Preliminary Report on Patentability for PCT/CN2012/084535, dated Nov. 4, 2014; 8 pgs.

PCT International Search Report for PCT/CN2012/084535, dated Nov. 4, 2014; 14 pgs.

English Abstract of CN101229312A (listed above under Foreign Patent Documents); 2 pgs.

English Abstract of CN101587412A (listed above under Foreign Patent Documents); 1 pg.

English Abstract of CN102073161A (listed above under Foreign Patent Documents); 1 pg.

English Abstract of CN10224481A (listed above under Foreign Patent Documents); 2 pgs.

English Abstract of CN102692748A (listed above under Foreign Patent Documents); 1 pg.

English Abstract of CN201993554U (listed above under Foreign Patent Documents); 2 pgs.

English Abstract of CN202600302U (listed above under Foreign Patent Documents); 1 pg.

English Translation of JP2003099192A (listed above under Foreign Patent Documents); 6 pgs.

English Translation of JP2010107685A (listed above under Foreign Patent Documents); 16 pgs.

English Translation of JP2010117829A (listed above under Foreign Patent Documents); 21 pgs.

* cited by examiner

TOUCH GRATING, DISPLAY DEVICE AND METHOD OF REALIZING STEREOSCOPIC DISPLAY AND TOUCH FUNCTIONS

CROSS REFERENCE TO RELATED APPLICATIONS

This application is based on International Application No. PCT/CN2012/084535 filed on Nov. 13, 2012, which claims priority to Chinese National Application No. 201210134897.8 filed on May 3, 2012, the contents of which are incorporated herein by reference.

TECHNICAL FIELD

Embodiments of the present invention relate to a touch grating, a display device and a method of realizing stereoscopic display and touch functions.

BACKGROUND

A principle of the 3D (Three Dimensions) image display is to make a left-eye image be seen by the left eye of a person, and a right-eye image be seen by his right eye, wherein, the left-eye and right-eye images are a pair of stereoscopic images having the parallax, so that a viewer can see a stereoscopic image similar to an object. In order to meet requirements of users, a 3D display technology has been applied to a display. The 3D display technologies can be classified into two categories: a glasses type and a naked-eye type.

Among them, the naked-eye 3D display technology will become a mainstream 3D display technology in the future, wherein displaying a stereoscopic image is achieved by using a grating. Exemplarily, the grating includes transparent stripes and opaque stripes. At a time, a left-eye image is seen by the left eye of a user through the transparent stripes while a right-eye image is blocked by the opaque stripes; at the next time, the right-eye image is seen by the right eye of the user through the transparent stripes while the left-eye image is blocked by the opaque stripes, so that a 3D image is seen by the user.

However, a touch function can not be realized by a display device having a 3D display function at present.

SUMMARY

According to embodiments of the invention, there are provided a touch grating, a display device and a method of realizing stereoscopic display and touch functions, so that a goal of allowing the display device to have a 3D display function as well as a touch function is achieved.

According to an embodiment of the invention, there is provided a touch grating, comprising: a first substrate; a second substrate, disposed in opposition to the first substrate; a planar electrode, disposed at an inner side of the first substrate facing the second substrate; a plurality of strip-shaped electrodes, being parallel to each other and disposed at an inner side of the second substrate facing the first substrate; and liquid crystal, disposed between the first substrate and the second substrate and driven by the planar electrode and the strip-shaped electrodes, wherein wirings are provided at four terminals of the planar electrode, respectively, and the wirings provided at the four terminals are used to determine a touch position.

According to an embodiment of the invention, there is provided a display device, comprising: a touch grating, as stated above; and a display unit, disposed at a light entering side of the second substrate of the touch grating, wherein the display unit is used to display an image upon electrified.

According to an embodiment of the invention, there is provided a method of realizing stereoscopic display and touch functions with the above display device, comprising: applying a first electric signal to each of the wirings at the four terminals of the planar electrode, the first electric signal being a sum signal of a direct current electric signal and an alternating current electric signal; and applying a second electric signal to the strip-shaped electrodes, wherein the second electric signal is different from the first electric signal so that a voltage difference is formed between the planar electrode and the strip-shaped electrodes.

Regarding the touch grating, the display device and the method of realizing stereoscopic display and touch functions provided by embodiments of the invention, through the planar electrode disposed at an inner side of the first substrate, the strip-shaped electrodes disposed at an inner side of the second substrate, and liquid crystal disposed between the first substrate and the second substrate and driven by the two electrodes, and by providing wirings at four terminals of the planar electrode, respectively, which are used to determine a touch position, a grating with a touch function is achieved, and furthermore, by means of applying the grating with the touch function to a display device, the display device can have a 3D display function as well as a touch function, thereby meeting requirements of a user.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
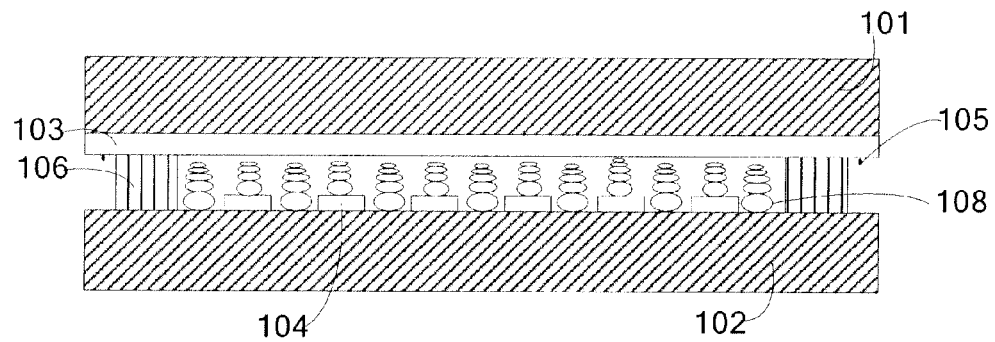
FIG. 1 is a structurally schematic view illustrating a touch grating provided by an embodiment of the invention.

According to an embodiment of the invention, there is provided a touch grating. As shown in FIG. 1, it includes: a first substrate 101; a second substrate 102; a planar electrode 103, disposed at an inner side of the first substrate 101; a plurality of strip-shaped electrodes 104, being parallel to each other and disposed at an inner side of the second substrate; and liquid crystal 108, disposed between the first substrate 101 and the second substrate 102 and driven by the planar electrode 103 and the strip-shaped electrodes 104. Wirings 105 are provided at four terminals of the planar electrode 103, respectively, and the wirings 105 provided at the four terminals are used to determine a touch position.

When the above touch grating is in use, electric signals are applied to the planar electrode 103 and the strip-shaped electrodes 104, respectively, so that an electric field is formed between the planar electrode 103 and the strip-shaped electrodes 104, and thus, the liquid crystal 108 between the two substrates are driven by the electric field, so as to make the liquid crystal 108 between the strip-shaped electrodes 104 and the planar electrode 103 be deflected. Thereby, transparent stripes and opaque stripes are formed, so that light is transmitted through the transparent stripes and is blocked by the opaque stripes. As an example, at a time, a left-eye image is seen by the left eye of a user through the transparent stripes while a right-eye image is blocked by the opaque stripes; at the next time, the right-eye image is seen by the right eye of the user through the transparent stripes while the left-eye image is blocked by the opaque stripes. Alternatively, as an example, at a certain time, a left-eye image is seen by the left eye of a user through the transparent stripes while a right-eye image is seen by the right eye of the user through the transparent stripes. And then, an effect of 3D display is formed.

Figure 2:
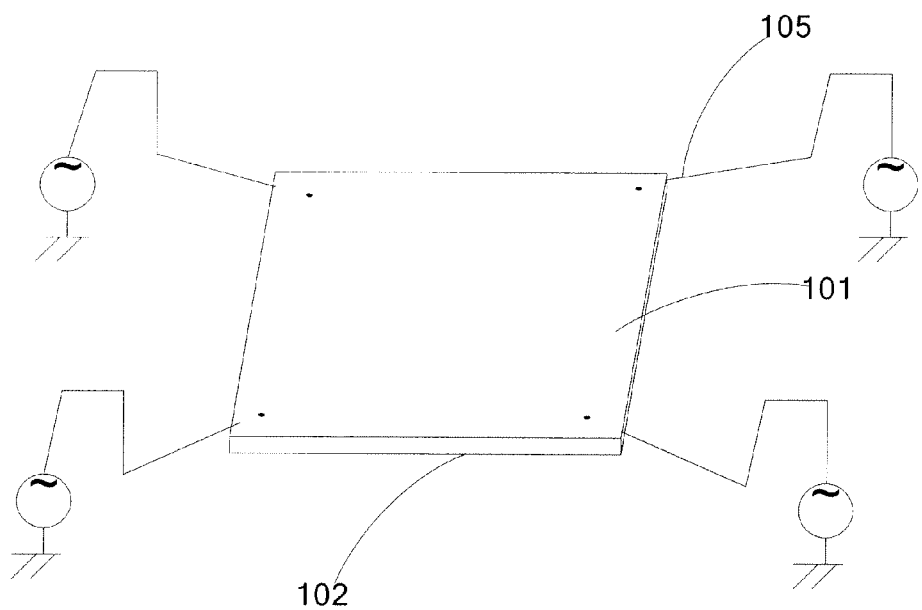
FIG. 2 is a structurally schematic view illustrating a touch grating provided by an embodiment of the invention.

As shown in FIG. 2, a touch of the first substrate 101 will cause a change of a voltage on the planar electrode 103. At this time, by means of applying the same electric signal to the wirings 105 disposed at the four terminals to thereby charging the planar electrode 103, and simultaneously, by measuring charging currents of the wirings 105 disposed at the four terminals, a touch position can be determined according to ratios between currents in the wirings 105 disposed at the four terminals, so as to endow the grating with a touch function.

It is to be noted that, only a part of structures for describing a scheme of the invention are denoted in all the drawings provided by the embodiments of the invention, and other structures irrelative to the inventive point are not denoted in the drawings.

Further, with reference to that shown in FIG. 1, the touch grating further includes a closed adhesive frame 106, which is provided between the first substrate 101 and the second substrate 102, and is located at edge locations of the first substrate 101 and the second substrate 102.

Exemplarily, the closed adhesive frame 106 is provided at the edge locations of the first substrate 101 and the second substrate 102, outflow of liquid crystal between the first substrate 101 and the second substrate 102 can be prevented, but also a certain gap between the planar electrode 103 and the strip-shaped electrodes 104 can be assured. Thereby, an electric field can be formed between the planar electrode 103 and the strip-shaped electrodes 104 upon electrified, so as to drive the liquid crystal to deflect and form transparent stripes and opaque stripes. As an example, the wirings 105 are provided at an outer side of the closed adhesive frame 106, so as to facilitate connection of the wirings 105 and external electric signals.

As an example, the strip-shaped electrodes are arranged with an equal interval (namely, a distance between any two adjacent strip-shaped electrodes is equal), and they have the same width. It is beneficial to control deflection angles of the liquid crystal by means of adjusting a voltage applied to the strip-shaped electrode 104 and regulating the electric field intensity between the planar electrode 103 and the strip-shaped electrodes 104, thereby forming uniform transparent and opaque stripes.

As an example, the interval between any two adjacent strip-shaped electrodes is larger than 5 μm.

Exemplarily, material for each of the planar electrode 103 and the strip-shaped electrodes 104 is a transparent, conductive material, such as, ITO (Indium Tin Oxide), which has a good conductivity and transparency. Of course, IZO (Zinc Tin Oxide) and other transparent, conductive materials may also be used.

As an example, because the touch grating is applicable to a display device by which not only a 2D image but also a 3D image can be displayed, when the 2D image is displayed by the display device, the touch grating only has to offer a touch function. In order to ensure normal display of the 2D image, the touch grating is in a normal white operating mode. Certainly, if it only needs to display the 3D image by the display device provided with the touch grating, the touch grating may be in a normal white operating mode or a normal black operation mode.

Figure 3:
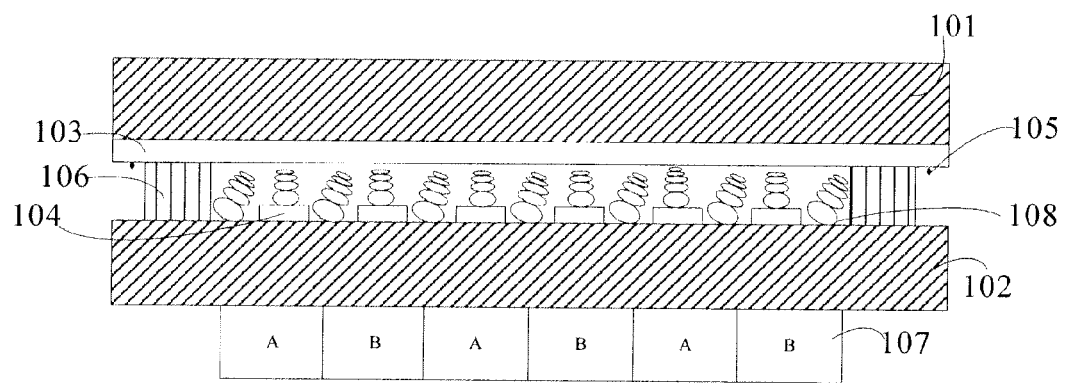
FIG. 3 is a structurally schematic view illustrating a display device provided by an embodiment of the invention.

According to an embodiment of the invention, there is further provided a display device. As shown in FIG. 3, it includes: a touch grating; and a display unit 107, disposed at an outer side of the second substrate of the touch grating (namely, at a light entering side of the touch grating). Herein, the touch grating is any one of touch gratings in the above embodiments, and the display unit 107 acts to display images upon electrified.

Exemplarily, an electric signal is applied to the display device, so that transparent stripes and opaque stripes are formed in a grating portion of the display device. Images displayed by the display unit 107 are classified into a left-eye image and a right-eye image. For example, in FIG. 3, an image A represents the left-eye image, and an image B represents the right-eye image. As an example, for a time serial manner, at a first time, light of the image A is transmitted through the transparent stripes of the grating so that the left-eye image is observed by the left eye of a user; and light of the image B is blocked by the opaque stripes of the grating so that the right-eye image can not be observed by the right eye of the user. At a second time, light of the image A is blocked by the opaque stripes of the grating so that the left-eye image can not be observed by the left eye of the user; and light of the image B is transmitted through the transparent stripes of the grating so that the right-eye image is observed by the right eye of the user. Alternatively, for a mode that is not the time serial manner, at the same time, light of the image A is transmitted through the transparent stripes of the grating so that the left-eye image is observed by the left eye of a user; and light of the image B also is transmitted through the transparent stripes of the grating so that the right-eye image is observed by the right eye of the user. Thus, an effect of 3D display is achieved by the display device.

Herein, as to the time serial manner, a time interval between the first time and the second time is not greater than the visual persistence time of the human eye.

When a grating portion of the display device is touched, a voltage on the planar electrode 103 will be changed. At this time, by means of applying the same electric signal to the wirings 105 disposed at the four terminals to thereby charging the planar electrode 103, and simultaneously, by measuring charging currents of the wirings 105 disposed at the four terminals, a touch position can be determined according to ratios between currents in the wirings 105 disposed at the four terminals, and thus, a touch function of the display device is achieved.

Wherein, the display unit may be a LCD display unit, and may also be an OLED (Organic Light-Emitting Diode) display unit, a plasma display unit, an electronic ink display unit, or the like.

As an example, if the display unit is the LCD display unit, then the display unit includes: a color filter substrate; an array substrate, disposed to face the color filter substrate to form a liquid crystal cell; liquid crystal material, filled in the liquid crystal cell; and an adhesive frame. The array substrate according to the embodiment of the invention includes a plurality of gate lines and a plurality of data lines, and these gate lines and data lines cross to each other to thereby define pixel units arranged in a matrix, each of which includes a thin film transistor functioning as a switch element and a pixel electrode. The pixel electrode of each pixel unit of the array substrate acts to apply an electric field for controlling a rotation of the liquid crystal material and to perform a displaying operation. In some examples, the liquid crystal display unit further comprises a backlight source provided for the array substrate.

After an image is displayed by the display unit of the liquid crystal display device, an effect of 3D display is achieved through a grating, and moreover the grating has a touch function, so that the liquid crystal display device has the touch function.

If the display unit is the OLED display unit, then the display unit includes: an OLED unit and a thin film transistor. The OLED unit includes: an anode conductor, a cathode conductor, and an organic material coating disposed between the anode conductor and the cathode conductor. Exemplarily, the anode conductor is of ITO.

After an image is displayed by the OLED display unit, an effect of 3D display is achieved through a grating, and moreover the grating has a touch function, so that the OLED display device has the touch function.

It is to be noted that, the display unit may be other display units than the LCD display unit, the OLED display unit, the plasma display unit, the electronic ink display unit, the invention do not set a limit to this.

According to an embodiment of the invention, there is further provided a method of realizing 3D and touch functions for the above display device, comprising:

S11, a first electric signal is applied to each of the wirings at the four terminals of the planar electrode.

Wherein, the first electric signal is a sum signal of a direct current electric signal and an alternating current electric signal. Exemplarily, the alternating current electric signal is a tiny electric signal. The tiny electric signal refers to such an electric signal that the amplitude of the AC electric signal is less than, such as 2V.

S12, a second electric signal is applied to the strip-shaped electrodes.

Wherein, with the use of the second electric signal and the first electric signal, a voltage difference is formed between the planar electrode 103 and the strip-shaped electrodes 104. By utilizing the voltage difference formed between the planar electrode 103 and the strip-shaped electrodes 104, liquid crystal are driven to be deflected, so as to form transparent stripes and opaque stripes. Thus, an effect of 3D display is achieved by the display device.

When a touch object touches the first substrate 101, a coupling capacitor is formed between the touch object and the first substrate 101, and moreover, there is a resistance in the touch object, so that a RC AC circuit is formed by the AC electric signal of the first electric signal. There is a microcurrent in the planar electrode 103 flowing to the touch object, so as to charge the coupling capacitor, and this causes a voltage at the touch position of the planar electrode 103 to change. At this time, the planar electrode 103 is charged by the DC electric signal of the first electric signal via the wirings 105 provided at the four terminals, so as to ensure that an electric field, which is substantially stable, is formed between the planar electrode 103 and the strip-shaped electrodes 104. Meanwhile, charging currents of the wirings 105 provided at the four terminals are measured, and the touch position can be determined in accordance with ratios of currents between the wirings 105 provided at the four terminals, thereby endowing the display device with the touch function.

As an example, the second electric signal is a square wave signal, and absolute values of differences between high and low voltage values of the square wave signal and a voltage value of the direct current electric signal are larger than or equal to a driving voltage of the liquid crystal. The driving voltage of the liquid crystal as stated in the embodiments of the invention refers to a minimal voltage necessary for driving the liquid crystal between the first substrate and the second substrate so as to achieve a 3D display effect.

The second electric signal changes between a high voltage and a low voltage by a certain frequency, so that deflection of the liquid crystal is changed accordingly, and this can avoid the liquid crystal from being in the same energized state for a long time and being dissociated. Furthermore, exemplarily, differences between high and low voltage values of the square wave signal and the voltage value of the DC electric signal are larger than the driving voltage of the liquid crystal, and this can ensure that a voltage difference larger than the driving liquid crystal voltage is formed between the planar electrode and the strip-shaped electrodes, so as to form transparent stripes and opaque stripes by driving the liquid crystal. Of course, when the differences between high and low voltage values of the square wave signal and the voltage value of the DC electric signal are both equal to the driving voltage of the liquid crystal, the 3D display may also be achieved.

An example will be given below to explain the above method.

S21, a first electric signal is applied to each of wirings at four terminals of a planar electrode.

Figure 4:
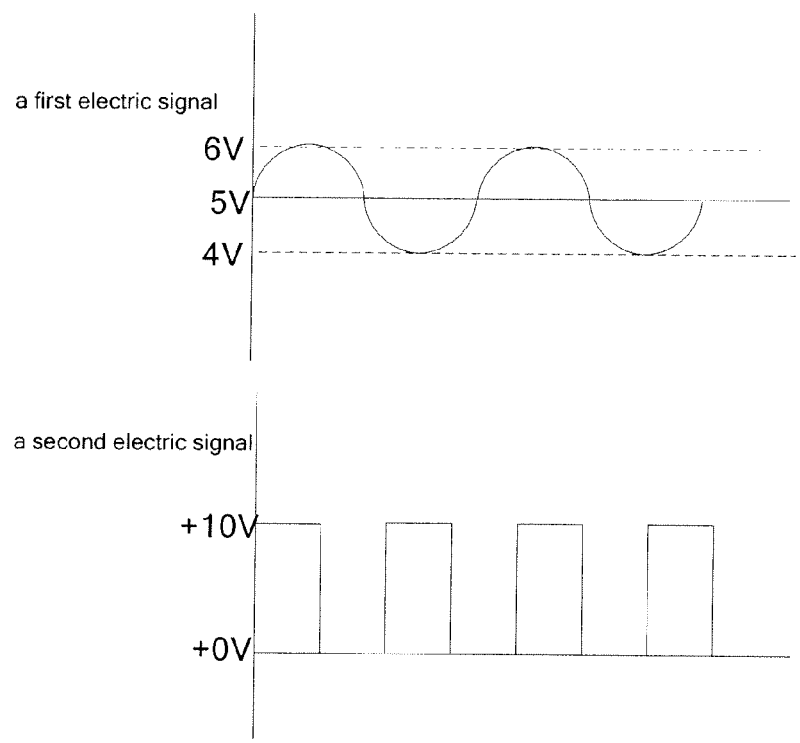
FIG. 4 is a schematic view illustrating examples of a first electric signal and a second electric signal, provided by an embodiment of the invention.

Wherein, as shown in FIG. 4, a direct current electric signal of the first electric signal is at +5V, its alternating current electric signal is an AC sinusoidal electric signal with an amplitude of 1V, and the driving voltage of the liquid crystal is 3V.

S22, a second electric signal is applied to the strip-shaped electrodes.

Wherein, as shown in FIG. 4, the second electric signal is a square wave signal with a high voltage value of +10V and a low voltage value of +0V.

In this case, a value of a voltage difference formed between the planar electrode 103 and the strip-shaped electrodes 104 approximates to 5V. By using the value of 5V voltage difference formed between the planar electrode 103 and the strip-shaped electrodes 104 to drive the liquid crystal, the liquid crystal are deflected, so as to form transparent stripes and opaque stripes. Thus, an effect of 3D display is achieved by the display device.

When a touch object touches the first substrate 101, a coupling capacitor is formed between the touch object and the first substrate 101, and moreover, there is a resistance in the touch object, so that a RC AC circuit is formed by the AC electric signal of the first electric signal. There is a microcurrent in the planar electrode 103 flowing to the touch object, so as to charge the coupling capacitor, and this causes a voltage at the touch position of the planar electrode 103 to change. At this time, the planar electrode 103 is charged by the DC electric signal of the first electric signal via the wirings 105 provided at the four terminals, so as to ensure that an electric field, whose voltage difference is closer to 5V, is formed between the planar electrode 103 and the strip-shaped electrodes 104. Meanwhile, charging currents of the wirings 105 provided at the four terminals are measured, and the touch position can be determined in accordance with ratios of currents between the wirings 105 provided at the four terminals, thereby endowing the display device with the touch function.

Regarding the touch grating, the display device and the method of realizing stereoscopic display and touch functions provided by the embodiments of the invention, through the planar electrode disposed at an inner side of the first substrate, the strip-shaped electrodes disposed at an inner side of the second substrate, and liquid crystal disposed between the first substrate and the second substrate and driven by the two electrodes, and by providing wirings at four terminals of the planar electrode, respectively, which are used to determine a touch position, a grating with a touch function is achieved, and furthermore, by means of applying the grating with the touch function to a display device, the display device can have a 3D display function as well as a touch function, thereby meeting requirements of a user.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A touch grating, comprising:
   a first substrate;
   a second substrate, disposed in opposition to the first substrate;
   a planar electrode, disposed at an inner side of the first substrate facing the second substrate;
   a plurality of strip-shaped electrodes, being parallel to each other and disposed at an inner side of the second substrate facing the first substrate; and
   liquid crystal, disposed between the first substrate and the second substrate and driven by the planar electrode and the strip-shaped electrodes,
   wherein wirings are provided at four terminals of the planar electrode, respectively, and the wirings provided at the four terminals are used to determine a touch position, the planar electrode is configured to drive the liquid crystal and determine the touch position.

2. The touch grating according to claim 1, further comprising: a closed adhesive frame, provided between the first substrate and the second substrate and located at edge positions of the first substrate and the second substrate.

3. The touch grating according to claim 1, wherein the strip-shaped electrodes are arranged with an equal interval, and have the same width.

4. The touch grating according to claim 3, wherein the interval between any two adjacent strip-shaped electrodes is larger than 5 μm.

5. The touch grating according to claim 1, wherein material for each of the planar electrode and the strip-shaped electrodes is a transparent, conductive material.

6. The touch grating according to claim 1, wherein the touch grating has a normal white operation mode.

7. The touch grating according to claim 1, wherein the touch grating has a normal black operation mode.

8. A display device, comprising:
   a touch grating according to claim 1; and
   a display unit, disposed at a light entering side of the second substrate of the touch grating,
   wherein the display unit is used to display an image upon electrified.

9. The display device according to 8, wherein the display unit is a liquid crystal display unit.

10. The display device according to claim 8, wherein the display unit is an organic light-emitting diode display unit, a plasma display unit or an electronic ink display unit.

11. A method of realizing stereoscopic display and touch functions with the display device according to claim 8, comprising:
    applying a first electric signal to each of the wirings at the four terminals of the planar electrode, the first electric signal being a sum signal of a direct current electric signal and an alternating current electric signal; and
    applying a second electric signal to the strip-shaped electrodes, wherein the second electric signal is different from the first electric signal so that a voltage difference is formed between the planar electrode and the strip-shaped electrodes.

12. The method according to claim 11, wherein the second electric signal is a square wave signal.

13. The method according to claim 12, wherein absolute values of differences between high and low voltage values of the square wave signal and a voltage value of the direct current electric signal are larger than or equal to a driving voltage of the liquid crystal.

14. The method according to claim 11, wherein the alternating current electric signal is a tiny electric signal.

15. The method according to claim 11, wherein the alternating current electric signal is an electric signal with an amplitude of being less than 2V.

16. The method according to claim 11, wherein a direct current electric signal of the first electric signal is at +5V, its alternating current electric signal is an AC sinusoidal electric signal with an amplitude of 1V; the second electric signal is a square wave signal with a high voltage value of +10V and a low voltage value of +0V; and a driving voltage of the liquid crystal is 3V.

17. The method according to claim 11, wherein a minimal absolute value of a difference between the direct current electric signal of the first electric signal and the second electric signal is larger than or equal to a driving voltage of the liquid crystal.

18. The method according to claim 11, wherein the second electric signal changes between a high voltage and a low voltage by a certain frequency.

* * * * *